United States Patent [19]

Schlieckmann

[11] 4,072,458
[45] Feb. 7, 1978

[54] MOULD CARRIER

[75] Inventor: Alfred Schlieckmann, Lindau, Germany

[73] Assignee: The Upjohn Company, Kalamazoo, Mich.

[21] Appl. No.: 623,424

[22] Filed: Oct. 17, 1975

[30] Foreign Application Priority Data

Dec. 2, 1974 Germany .............................. 2456949

[51] Int. Cl.$^2$ ............................................... B29C 1/16
[52] U.S. Cl. ......................... 425/451.6; 425/DIG. 128
[58] Field of Search ................ 425/387 R, 451.6, 453, 425/454, 451, 451.5, DIG. 128

[56] References Cited

U.S. PATENT DOCUMENTS

| | | | |
|---|---|---|---|
| 1,514,183 | 11/1924 | Steele et al. | 425/387 X |
| 1,976,740 | 10/1934 | McChesney | 425/387 X |
| 2,559,377 | 7/1951 | Soderquist | 425/149 |
| 3,141,195 | 7/1964 | Haas | 425/451.6 X |
| 3,200,438 | 8/1965 | McIlvin | 425/451.6 X |
| 3,840,317 | 10/1974 | Koch et al. | 425/451.6 |

Primary Examiner—Robert L. Spicer, Jr.
Attorney, Agent, or Firm—St.Onge, Mayers, Steward & Reens

[57] ABSTRACT

The invention relates to a mould carrier with a lower platen and an upper platen which can be pivoted with respect to the lower platen through 90° upwards, for receiving the mould halves of, more particularly, polyurethane foam moulds, with an actuating member, which can be moved linearly for opening and closing the mould carrier, and with a two-armed main lever, whose one arm is connected via a toggle lever in an articulated manner with the actuating member, and whose other arm engages the upper platen, in the case of which the toggle lever in the closed position of the mould carrier is perpendicular to the direction of movement of the actuating member for dead-center locking.

10 Claims, 7 Drawing Figures

MOULD CARRIER

BACKGROUND OF THE INVENTION

Mould carriers of the most various different types have been proposed and have been used for years for the production of polyurethane products. The mould halves are used in these mould carriers for the various products and the mould carriers bring about the opening and closing of the mould halves.

A carrying device for injection moulding and vulcanizing moulds has been proposed (German patent specification (Offenlengungsschrift) No. 2,020,363), which is provided with a lower carrier for accepting a lower mould and an upper carrier for accepting an upper mould, the two carriers being adjustably carried so that they can be arrested in different angular settings between the upper and lower mould. Owing to this adjustability the possibility is to be created of arranging the mould or, respectively, the mould cavity not only in the horizontal direction but also in a certain oblique position. In particular the lower carrier and the upper carrier can be swung through 90° for opening and for closing the mould in relation to each other. The mould is adapted to be held locked in the closed position by a lever constructed as a pressure support, since the lever in the closed position for dead-centre locking is perpendicular to the direction of movement of an actuating member, which serves for opening and for closing the mould carrier. In this case the actuating member consists of a piston cylinder arrangement fixed pivotally underneath the mould carrier and connected via a two-armed lever linkage with the pressure support. The two-armed lever linkage has two tension struts running to the side of the mould carrier, something which is disadvantageous in terms of limiting the maximum size of the moulds which can be used with the mould carrier. Furthermore as regards the vertical height of the moulds which can be inserted into the mould carrier there is a limitation, since only one mould of a fixed vertical height can be inserted into the mould carrier. A further disadvantage is the non-linear movement of the actuating member, thereby eliminating the possibility of controlling opening and closing of the mould carrier in an automated plant using simple cams or ramps. Another disadvantage of the known mould carrier resides in that on opening the mould carrier there is the danger that mould parts, which have a substantial vertical dimension may be damaged inasmuch as, on opening the mould carrier the opening and pivoting movement runs along a circular path from the outset. The last mentioned disadvantage is admittedly dealt with by a modern development of the mould carrier in accordance with the U.S. Pat. No. 3,840,317, since a parallel stroke is arranged to take place before the circular pivoting movement on opening. However the other disadvantages still inherent in this more modern further development. The most convenient of the mould carriers as proposed to date are those described in the German patent specification (Offenlegungsschrift) No. 1,909,050. In one of the embodiments described in this specification an upper platen, carrying the upper mould half can be pivoted upwards through 90° away from the lower platen carrying the lower mould half by means of a two-armed lever for opening and closing. The two-armed lever has its pivot point arranged on the mould carrier and is actuated by a toggle lever, which is pivoted on an actuating member. The actuating member which is arranged so as to project to the rear from the mould carrier, consists of a linearly shifting pin, on which the toggle lever is pivoted. The advantages of this known mould carrier reside more especially in that the linear movement of the actuating member, arranged behind the mould carrier, provides a favourable possibility for the control of the opening and closing movement. In the case of a stationary mould carrier the linear movement of the actuating member can be controlled by a piston cylinder arrangement. The toggle lever engaging the two-armed lever is so arranged that in the closed position of the mould carrier it is normal to the direction of movement of the actuating member so that a dead-centre locking of the mould carrier is brought about in the closed position.

A disadvantage in the case of this prior art mould carrier resides in that the upper mould half can only be pivoted away from the lower mould half. Such a pivoting movement is sufficient if simple articles with a small height are to be moulded. On the other hand in the case of complicated taller articles it is necessary to raise the upper mould half before effecting the "pivoting-away" movement through a fixed displacement in a parallel direction until the moulded product has come clear of the upper mould half, and it is only after this that the pivoting- or swinging-away movement can be begun. A further disadvantage resides in that the mould carrier is not adjustable for different moulds as regards height so that the mould carrier is generally not suitable for accepting moulds of different height.

Another very serious disadvantage resides in that the whole actuating mechanism extends for a very considerable distance to the rear by an amount which is approximately twice the depth of the mould. If control or operation using cams were to be considered it would then be necessary to provide an extremely expensive bearing arrangement owing to this great length of projection to the rear.

In the German patent specification No. 1,909,050 a second embodiment of the mould carrier is described wherein it is possible to raise the upper mould half in a guided parallel movement. The two-armed lever of this embodiment engages laterally on the upper platen of the mould carrier, since the point of engagement is constituted by a pin which can slide in a slot in order to make possible parallel guidance of the upper mould half despite the pivoting movement of the lever. In the case of this known mould carrier the upper mould half is admittedly raised in a parallel direction from the lower one; however pivoting into the 90° position is not possible. Owing to the lateral connection or engagement of the two-armed lever furthermore the use of the mould carrier is considerably limited as regards the size of the moulds to be used. It is therefore only possible to use moulds up to a certain breadth as determined by the position of the two-armed lever connected on both sides. The vertical adjustment of the mould carrier is not possible either as is the case with the initially described embodiment so that it is not practicable either.

SUMMARY OF THE INVENTION

The invention has the aim of creating a mould carrier, which can be universally used for receiving, more particularly, polyurethane foam moulds, which is suitable for the widest possible range of moulds both as regards their height and also as regards their lateral dimensions. More particularly in the case of this mould carrier the upper mould half is adapted to be raised from the lower one in a parallel direction initially before the pivoting-away movement, the mechanism for the parallel stroke and the swinging-away movement being connected on the same side to that the mould carrier is freely accessible from the other three sides and the use of moulds of any desired length and breadth dimensions is possible. Furthermore the mould carrier permits a simple central height adjustment so that it can be adapted without great expenditure of time and technical means even by unskilled persons to moulds with different heights. Finally the opening and closing of the mould carrier is capable of being controlled by means of an actuating member which is arranged underneath the mould carrier and is moved linearly in order on the one hand not to obstruct the pivoting-away of the upper part and the filling operation, and on the other hand to make possible a simple control by cams or piston cylinder arrangements.

This aim is achieved in the case of a mould carrier of the initially mentioned type in accordance with the invention in that the linearly moving actuating member is arranged underneath the mould carrier; further in that the two-armed main lever is journalled at its pivot point at the free end of an intermediate link pivoted on the mould carrier. In addition, a guide pin extends from the upper side of the upper platen, and a guide lever is pivoted on the mould carrier at the same position as the intermediate link, which at its free end has a guide bush, while guides the guide bolt axially in a shifting manner, such that the pivoting movement of the guide lever in the closing position of the mould carrier is locked beyond the parallel position of the upper and lower platens. Finally the upper platen can be vertically adjusted with respect to the pivot point of the main lever on the upper platen.

In the case of the mould carrier in accordance with the invention the opening and closing is controlled by means of an actuating member which is arranged underneath the mould carrier and can be moved linearly. The mould carrier is thus suitable more particularly for automated plant operation wherein a number of mould carriers circulate on an endless track and they are transported from one working station to the next one. The opening and closing can in this case be brought about by simple control cams or driving cams, which act on the actuating member. In this case the opening and closing movements are derived from the advance of the circulating track so that no additional drive and control means will be required. On the other hand the actuating member, and therefore also the opening and closing of the moulds can be actuated by a piston cylinder arrangement. This control system is more particularly suited for stationary mould carriers. This simplified arrangement which is not liable to disorder, is more particularly appropriate for the majority of applications, since most polyurethane processing factories start operations with individual manufacture using a stationary system, and only later gradually go over to automated operation, in which case they are still enabled to use the same mould carriers.

The mould carrier in accordance with the invention makes possible a combined parallel and pivoting movement of the upper mould half, since the two-armed lever is not pivoted at its fixed pivot point on the mould carrier but instead is pivoted via an intermediate link. On raising the upper platen, in order to raise and open the upper mould half, the later is firstly moved by the guide pin and the guide lever upwards in a parallel manner, the intermediate link making possible articulation of the two-armed main lever about two pivot points. It is only when the main lever comes to abut against the guide bush of the guide lever that the two levers are pivoted together so that the upper platen is swung away at 90°. Since the main lever and the guide lever are both connected at the same side of the upper platen, the other three sides of the mould carrier are free and the moulds to be used are not, for this reason, subject to any limitation as regards their lateral dimensions.

The toggle lever is so attached to the actuating member that in the closed condition of the mould carrier it is perpendicular to the direction of movement of the actuating member, as a result of which a dead-centre locking of the mould carrier is brought about in its closed position.

In accordance with the invention the upper platen is arranged to be adjustable in height owing to the feature that the distance between the pivot of the main lever on the upper platen and this upper platen is adjustable. In this manner it is possible to adapt the distance between the upper and lower platens of the mould carrier to moulds of different height. In particular in this manner it is also possible to set the closing pressure, with which the mould halves are pressed against each other in a closed position. The vertical adjustment of the upper platen for adjustment of the closing pressure is of particular advantage. Owing to the toggle lever action very high forces are produced, which in the most nearly similar prior art constructions often lead to mould breakage. It is particularly advantageous that, in accordance with the invention only a single central height adjustment is made possible.

In order to keep the guide lever properly positioned during the initial portion of the mould-opening stroke and thus maintain the parallel relationship of the upper and lower platens, means are provided for limiting the tendency of the lever to pivot on account of its own weight. This limitation of the pivoting movement is conveniently effected by pivoting a tension rod on the guide lever and this rod is guided in an abutment bush attached to the mould carrier. An abutment buffer is attached to the free end of the tension rod for cushioning impact with the bushing. On pivoting the guide lever into the closed position the abutment buffer comes into contact with the abutment bush so that the tension rod prevents a further pivoting of the guide lever. On pivoting the upper platen upwards on the other hand the tension rod is shifted out to the rear by the abutment bush so that the pivoting movement of the guide lever is not obstructed. Advantageously the position of the abutment buffer on the tension rod is adjustable. Owing to this adjustment the end position of the guide lever can be determined in which a pivoting movement is blocked. With the help of the adjustability of the abutment buffer of the parallelism of the upper and lower platens becomes possible.

In accordance with an advantageous embodiment of the invention providing for adjustment in height of the upper platen, the main lever is pivotted on the transverse trunnion of a T-pin, which is axially adjustable in the guide pin and at its upper end has a screw thread; on this upper end a conical nut is screwed, which lies against a correspondingly formed conical inner surface of the guide pin and the nut is secured in the guide pin by a lock-nut screwed on to the pin. In this embodiment a particularly simple and easy vertical adjustment of the upper platen becomes possible. By turning the conical nut the T-pin is displaced in the guide pin so that the distance of the transverse trunnion of this pin, forming the pivot point for the main lever, is changed via the upper platen connected with the guiding pin. Therefore only a single centrally engaging adjustment operation is necessary for vertical adjustment, while the whole lever mechanism can remain completely unchanged. Since for vertical adjustment only twisting of the conical nut is necessary, this vertical adjustment can be carried out very rapidly and without special skills. With the help of a torque wrench it is furthermore possible to make a very precise setting of the closing pressure with the mould inserted in position and closed. By tigtening up the lock-nut the conical nut is secured in a set position.

Advantageously the upper platen is clamped by means of plate springs to the guide pin. Thus, in this embodiment any lack of parallelism of the moulds is compensated for.

If particularly shallow moulds are to be used the range of vertical adjustment can be increased by an intermediate member, which can be inserted between the guide pin and the upper platen in order to extend the guide pin.

In accordance with a further embodiment of the invention, a tension spring is fixed betwen the end of the guide lever having the guide bush and the arm of the lever engaging the upper platen. This facilitates the parallel stroke action at the beginning of the opening operation.

The actuating member is preferably a sliding shoe, which can be displaced on a guiding rod. This sliding shoe can be diaplced during travel of the mould carrier by a driving cam or, when the mould carrier is stationary, by a piston cylinder arrangement.

In that follows the invention will be described in more detail with reference to an embodiment shown in the accompanying drawings.

DETAILED DESCRIPTION OF THE PREFERRED EMBODIMENT

The mould carrier has in its lower part, which for example can be attached to the circulating track, a lower platen 10. The lower part of mould carrier 10 is provided with a rail 12 on which a sliding shoe 14 is mounted. The sliding shoe 14 constitutes the actuating member and can, for example by means of a roller on it, come into contact with a driving cam or ramp or, as is represented for example in FIGS. 5 and 6, it can be displaced on the rail 12 while controlled or guided by a piston cylinder arrangement 16. Owing to the shifting of the sliding shoe 14 via a lever system the parallel stroke and pivoting movement of an upper platen 18 is brought about. On the upper platen 18 and the lower platen 10 there are respectively the upper and the lower mould halves which are attached by screws or the like for example. These mould halves are represented in the drawing in dot-dash lines.

Figure 2:
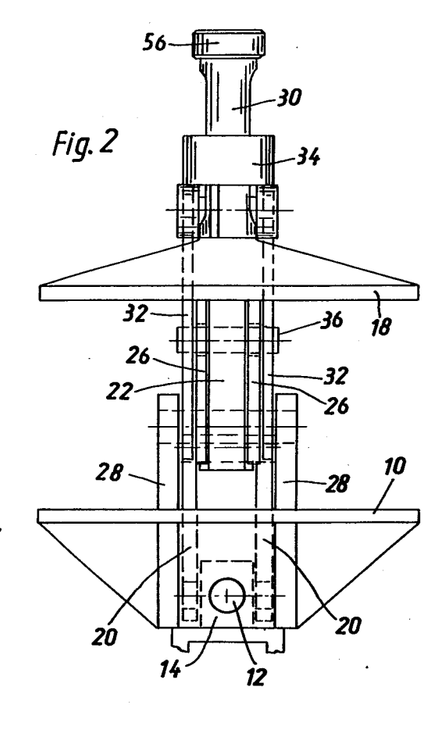
FIG. 2 shows a diagrammatic front view of the mould carrier of FIG. 1.
Figure 4:
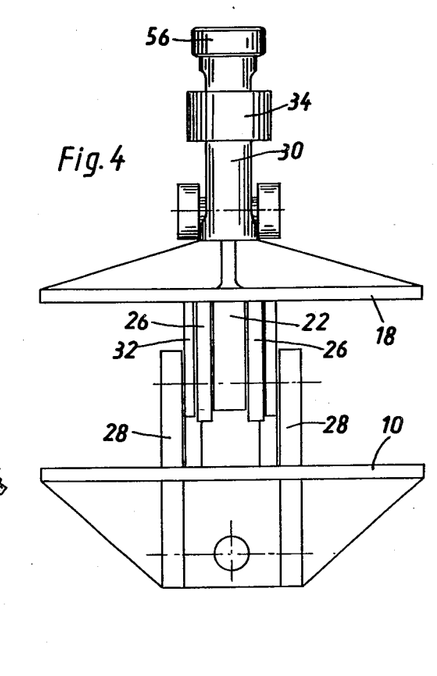
FIG. 4 shows a front view of the mould carrier in accordance with FIG. 3.

The lever system comprised in what follows consists respectively of levers arranged in pairs, which are arranged symmetrically with respect to the centre axis of the mould carrier in order to avoid asymmetrical forces. For simplicity of description in what follows only one lever is mentioned, as is represented also in the sides views. The symmetrical arrangement of the lever pairs is shown respectively in FIGS. 2, 4 and 5.

On the sliding shoe 14 a toggle lever 20 is pivoted. The other end of the toggle lever 20 is connected in a pivoting manner with one arm of a two-armed main lever 22. The other arm of the main lever 22 is pivoted in a manner to be described below on the upper platen 18. The pivot point 24 of the main lever 22 is journalled or arranged on the free end of an intermediate link 26, which is pivoted on a frame part 28 of the lower platen of the mould carrier.

On the upper face of the upper platen 18 a guide pin 30 is fixed. On this guide pin 30 the main lever 22 is pivotally attached in a vertically adjustable manner later to be described. On the same bearing trunnion, with which the intermediate link 26 is pivoted, a guide lever 32 is pivoted on the frame part 28 of the mould carrier. The cranked guide lever 32 has at its free end a guide bush 34, in which the guide pin 30 is guided in an axially shifting manner. In the guide lever 32 a trunnion 36 is pivoted or journalled, to which a tension rod 40 is attached. The tension rod 40 is guided in a axially shifting manner by an abutment bush 42, which is attached to the lower part of the mould carrier. The tension rod 40 possesses at its end an abutment buffer 44, which can be adjusted by means of a thread in its position on the tension rod 40. Since the intermediate links 26 are located between the guide levers 32 arranged in pairs, these intermediate links have a hole 38 through which the trunnion 36 passes. The hole 38 is of larger diameter than the trunnion 36 so that the intermediate link 26 can be pivoted with respect to the guide lever 32 in accordance with this diameter play during parallel stroke action.

In what follows the manner of operation on opening and closing of the mould carrier will be described.

Figure 3:
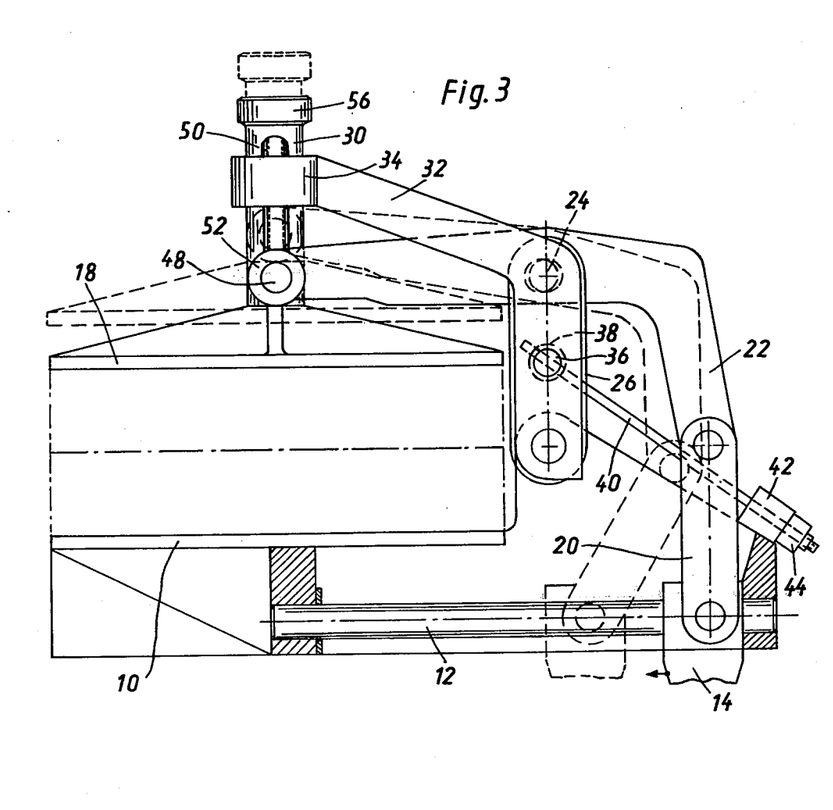
FIG. 3 shows a side view, corresponding to FIG. 1, indicating the manner of operation of the lever mechanism during the parallel stroke.

In the closed position of the mould carrier, which is represented in full lines in FIG. 3, the sliding shoe 14 is located in its one (right-hand) end position. The toggle lever 20 is perpendicular to the rail 12 and the upper platen is pressed firmly down by the main lever 22, which bears against the intermediate link 26. Owing to the vertical setting of the toggle lever 20 automatic locking is achieved, that is to say a force pressing the upper platen 18 upwards cannot bring about any displacement of the sliding shoe 14 and therefore the upper platen 18 cannot be moved upwards and the closed mould cannot be opened. If the sliding shoe 14 is moved out of this end position to the left into the position shown in FIG. 3 in broken lines, the upper platen 18 and with it the upper mould half will be displaced in a parallel manner upwards. This parallel stroke is due to the fact that the guide pin 30 connected with the upper platen 18 is guided in the guide bush 34. The guide lever 32 remains during this parallel stroke in its position, since its weight tends to swing it in a counter-clockwise direction (in terms of FIG. 3), while it is hindered from making such a pivoting movement owing to the fact that the abutment buffer 44 comes into contact with the abutment bush 42 and the tension rod 40 accordingly holds back the guide lever. During this parallel stroke the main lever 22 can carry out the necessary relative movement with respect to the guide lever 32 since it is not rigidly pivoted on the mould carrier but instead is pivoted on the intermediate link 26, which makes possible a shifting of the point of connection 24 to the left (in terms of FIG. 3). In order to make possible this compensatory movement of the intermediate link 26 the hole 38 has a larger diameter than the trunnion 36.

Figure 1:
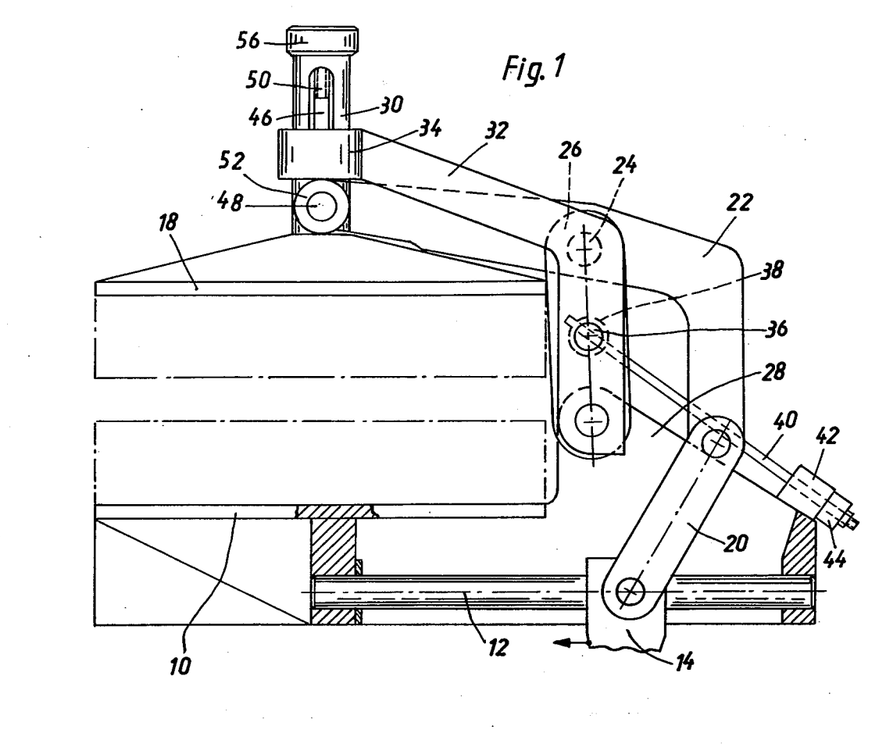
FIG. 1 shows a side view of a mould carrier in accordance with the invention at the end of the parallel stroke action of the opening operation.

In the position shown in FIG. 3 in broken lines, which corresponds to the position in FIG. 1, the main lever 22 moves so that its pivot point on the guide pin 30 comes into contact with the guide bush 34 of the guide lever 32. If the sliding shoe 14 is moved still further to the left in this position, the main lever 22 on its pivoting movement entrains the guide lever 32 so that the two levers 22 and 32 and accordingly the upper platen 18 are pivoted (clockwise FIG. 6). In this pivoting of the guide lever 32 the tension rod 40 is pushed outwards through the abutment bush 42. When the sliding shoe 14 comes into its alternate end position shown in FIG. 6 the upper platen 18 has been swung upwards through 90° into its vertical position.

On closing the moulds the operation takes place in the opposite order. The upper part of the mould carrier is tipped through 90° out of the position shown in FIG. 6 until the abutment buffer 44 comes into contact with the abutment bush 42. In this position the guide lever 32 is held by rod 40 preventing further pivoting. Further shifting of the sliding shoe 14 to the right causes the main lever 22 to move the upper platen 18 down in a parallel manner. When the two mould halves come into contact with each other, the toggle lever 20 moves into its vertical locked position, in which it exerts the closing pressure provided for.

It will appear clearly from the manner of operation described that owing to an axial displacement of the position of the abutment buffer 44 on the tension rod 40 the parallel setting of the upper platen 18 in respect to the lower platen 10 can be effected.

Figures 5, 6, 7:
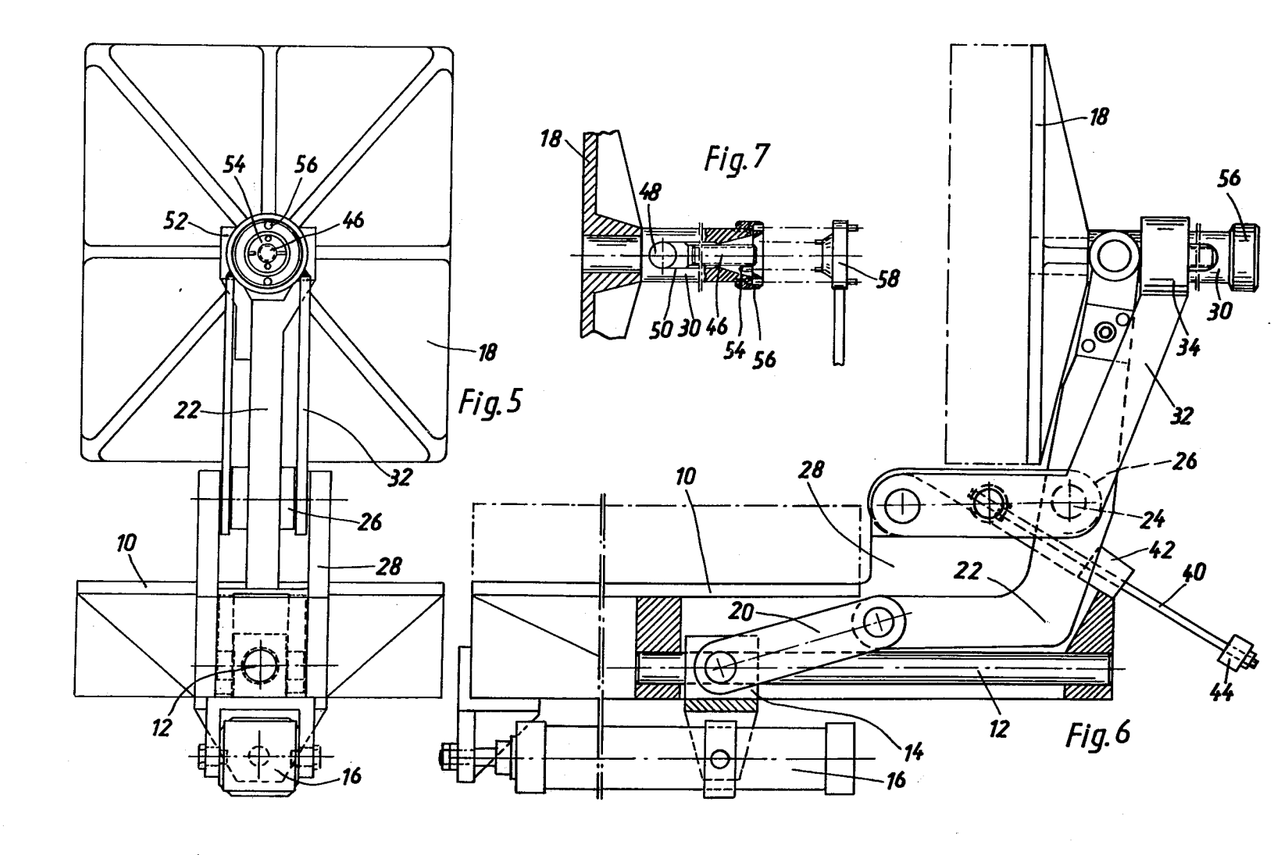
FIG. 5 shows a rear view of the mould carrier in the open position (FIG. 6).
FIG. 6 shows a side view of the mould carrier in the open position.
FIG. 7 shows partly in axial view the vertical adjustment of the mould carrier.

In what follows the vertical adjustment of the upper platen will now be described with reference to FIG. 7. The guide pin 30 is attached to the upper platen 18. If desired the upper platen 18 and the guide pin 30 can be clamped together with the help of plate springs 31 (FIGS. 6 and 7), something which has the advantage that a slight tipping of the upper platen 18 becomes possible in order to compensate for a slight lack in parallelism. The guide pin 30 has a co-axial internal hole, an inverted T-shaped pin 46 is guided with the possibility of axial movement. The transverse trunnions 48 of this T-pin extend outwardly through lateral longitudinal slots 50 of the guide pin 30. On these transverse trunnions 48 the main levers 22 are pivoted using bearing eyes 52. The T-pin 46 has at its upper end a screw thread, on to which a conical nut 54 can be screwed. The nut 54 has its conical outer surface resting against a corresponding, conical inner surface of the guide pin 30. By means of a lock-nut 56 screwed on an outer screw thread of the guide pin 30 the conical nut 54 is secured in the guide pin.

For vertical adjustment of the upper platen 18 the locknut 56 is slackened off and by a twisting of the conical nut 54 the T-pin 46 is displaced in an upward or a downward direction. As a result the pivot point of the main lever 22 is shifted vis-à-vis the guide pin 30 and accordingly with respect to the upper platen 18. When the mould is closed it is in this respect also possible to set the closing pressure exactly to a desired value by tightening the conical nut 54 with the help of a torque wrench 58 to the desired value and is secured by tightening up the lock-nut 56.

I claim:

1. A mould carrier for complementary mould halves of a mould particularly adapted for use in making polyurethane foam products, which comprises in combination a mould carrier frame;
   lower and upper platens respectively supporting said complementary mould halves on said frame and pivotal mounting means on said frame for at least one of said platens to permit movement thereof between a mould closed position wherein said platens are disposed in parallel relation, and a mould open position wherein said platens are disposed substantially 90° to each other;
   an actuating member mounted on said frame for reciprocal linear movement; and
   a compound lever system connected between said actuating member and said pivotally mounted platen to move said platen between mould open and mould closed positions in response to reciprocal movement of said actuating member, said compound lever system comprising:
   (a) a two-armed main lever and an intermediate link, said link being pivotally connected at one of its ends to said main lever intermediate the ends of the latter, the other end of said link being pivotally connected to said frame whereby said main lever is supported on said frame to permit its articulation about one or more pivot points;
   (b) a toggle lever connecting a first arm of said main lever to said actuating member;
   (c) a guide pin secured to the upper face of said pivotally mounted platen, and trunnion means on said guide pin pivotally connecting and supporting said platen on the other arm of said main lever, and means for adjusting said trunnion means axially of said guide pin whereby to change the pivot point of said main lever along said pin;
   (d) a guide lever pivotally mounted at one of its ends to said frame coaxially with the pivotal connection of said intermediate link to said frame, said guide lever at its opposite end having a bushing which receives said guide pin to permit limited axial movement of said pin relative to said guide lever;
   (e) said toggle lever being disposed, when said reciprocal actuating means is at its limiting position corresponding to mould closed position, to lock said main and guide levers against pivotal movement.

2. A mould carrier as defined in claim 1, wherein means is provided for limiting the pivotal movement of said guide lever, said means comprising a tension rod, an abutment bushing secured to said carrier frame and receiving said tension rod for axial sliding thereof in said bushing, one end of said tension rod being pivotally connected to said guide lever adjacent its pivotal connection to said frame, the other end of said tension rod having an abutment buffer secured thereto to limit the travel of said rod in said bushing.

3. A mould carrier as defined in claim 2, wherein said abutment buffer is adjustably secured to said tension rod so as to be positionable therealong, and means for securing said buffer in adjusted position on said rod.

4. A mould carrier as defined in claim 1, wherein said trunnion means on said platen guide pin is adjustably positionable along said pin, and means for securing said trunnion means in adjusted position on said pin.

5. A mould carrier as defined in claim 4, wherein said guide pin is tubular and is formed with lateral longitudinal slots, and said trunnion means comprises a T-shaped pin received in said tubular guide pin so that the head of the T-shaped pin extends laterally through said longitudinal slots; a conical nut, said pin and nut having complementary threads to allow said nut to be adjustably screwed along the leg of said T-shaped pin; said tubular guide pin having at its outer end an internal conical surface complementary to that of said nut and forming a bearing surface therefor; and means on the outer end of said guide pin for locking said nut in adjusted position on said T-shaped pin.

6. A mould carrier as defined in claim 4, wherein said platen guide pin is secured to said platen through plate spring means to allow for limited tipping of said platen relative to said pin, whereby to compensate for slight non-parallelism of said pivotable platen with said other platen.

7. A mould carrier as defined in claim 1, wherein said actuating member is a sliding shoe; and rail means supported on said carrier frame on which said shoe is trained for reciprocation between limiting positions corresponding to said mould open and mould closed positions of said platens.

8. A mould carrier as defined in claim 7, which further includes an actuating piston and cylinder connected to and adapted and arranged to effect reciprocation of said sliding shoe.

9. A mould carrier as defined in claim 7, which further includes an endless track along which said carrier is caused to travel, and cam means disposed along said track for engagement of said sliding shoe of said actuating means as said carrier is advanced along said track to effect reciprocation of said shoe thereby.

10. A mould carrier as defined in claim 1, wherein said actuating member is mounted on said frame below said mould carrier.

* * * * *

UNITED STATES PATENT OFFICE
CERTIFICATE OF CORRECTION

Patent No. 4,072,458    Dated February 7, 1978

Inventor(s) Alfred Schlieckmann

It is certified that error appears in the above-identified patent and that said Letters Patent are hereby corrected as shown below:

Column 2, line 42:    Should read:
  of this               in this

Column 3, line 4:     Should read:
  to that               so that

Column 3, line 29:    Should read:
  while                 which

Column 4, line 19:    Should read:
  pivot of              pivot point of

Column 4, line 56:    Should read:
  buffer of             buffer adjustment of

Column 5, line 32:    Should read:
  displced              displaced

UNITED STATES PATENT OFFICE
CERTIFICATE OF CORRECTION

Patent No. 4,072,458  Dated February 7, 1978

Inventor(s) Alfred Schlieckmann

It is certified that error appears in the above-identified patent and that said Letters Patent are hereby corrected as shown below:

Column 5, line 35:    Should read:

In that               In what

Column 7, line 52:    Should read:

hole, an              hole, in which an

Signed and Sealed this

*Twenty-ninth* Day of *August 1978*

[SEAL]

Attest:

RUTH C. MASON
*Attesting Officer*

DONALD W. BANNER
*Commissioner of Patents and Trademarks*